US012628260B2

(12) United States Patent
Tang et al.

(10) Patent No.: US 12,628,260 B2
(45) Date of Patent: May 12, 2026

(54) CENTRALIZED LIGHT SUPPLY APPARATUS

(71) Applicant: ZTE Corporation, Shenzhen (CN)

(72) Inventors: Ningfeng Tang, Shenzhen (CN); Yingchun Shang, Shenzhen (CN); Xun Chen, Shenzhen (CN); Bing Ye, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 88 days.

(21) Appl. No.: 18/718,896

(22) PCT Filed: Nov. 29, 2022

(86) PCT No.: PCT/CN2022/135117
§ 371 (c)(1),
(2) Date: Jun. 12, 2024

(87) PCT Pub. No.: WO2023/109508
PCT Pub. Date: Jun. 22, 2023

(65) Prior Publication Data

US 2025/0048523 A1 Feb. 6, 2025

(30) Foreign Application Priority Data

Dec. 15, 2021 (CN) ......................... 202111539017.0

(51) Int. Cl.
*H05B 47/18* (2020.01)
*H05B 47/21* (2020.01)

(52) U.S. Cl.
CPC ........... *H05B 47/183* (2024.01); *H05B 47/22* (2020.01)

(58) Field of Classification Search
CPC .................. H05B 47/183; H05B 47/22; H04Q 2011/0039; H04Q 2011/005;
(Continued)

(56) References Cited

U.S. PATENT DOCUMENTS

| | | | |
|---|---|---|---|
| 11,159,240 | B1 | 10/2021 | Di Mola et al. |
| 2021/0044356 | A1 | 2/2021 | Aboagye et al. |

FOREIGN PATENT DOCUMENTS

| | | | |
|---|---|---|---|
| CN | 106452569 | A | 2/2017 |
| CN | 111357299 | A | 6/2020 |

(Continued)

OTHER PUBLICATIONS

Chinese Office Action; Application No. 202111539017.0; Filing Date: Dec. 15, 2021; Date of mailing:Aug. 15, 2025; 11 pages.

(Continued)

*Primary Examiner* — Daniel D Chang
(74) *Attorney, Agent, or Firm* — CANTOR COLBURN LLP

(57) ABSTRACT

Embodiments of the present disclosure provide a centralized light supply apparatus, including: a controller, at least one light source pool, and a plurality of CPO switches. The controller is connected with the light source pool and the plurality of CPO switches through a two-way communication channel, and the light source pool is connected with the plurality of CPO switches through a photoelectric hybrid connector. The controller is configured to control the light source pool and the plurality of CPO switches. The light source pool is configured to output a light source to the plurality of CPO switches under control of the controller. The plurality of CPO switches are configured to modulate the received light source into an optical signal under control of the controller and output the optical signal. The light source pool may be cascaded and expanded through one controller. The problems that in the related art, an ELS panel pluggable light source occupies a front panel of a device and occupies a large space can be solved. Through the photoelectric hybrid connector, more light sources can be con-
(Continued)

nected and occupy small space on the panel, and the space occupied by the panel is greatly reduced.

18 Claims, 3 Drawing Sheets

(58) Field of Classification Search
CPC .............. H04Q 11/0005; H04B 10/801; H04B 10/032; H04B 10/038; G02B 6/42
See application file for complete search history.

(56) References Cited

FOREIGN PATENT DOCUMENTS

| | | | | |
|---|---|---|---|---|
| CN | 113141549 A | * | 7/2021 | ......... H04Q 11/0003 |
| CN | 214174690 U | | 9/2021 | |

OTHER PUBLICATIONS

European Search Report for corresponding application EP22906258; Mail date Feb. 10, 2025.
International Search Report for corresponding application PCT/CN2022/135117 filed Nov. 29, 2022; Mail date Feb. 10, 2023.

* cited by examiner

CENTRALIZED LIGHT SUPPLY APPARATUS

CROSS-REFERENCE TO RELATED APPLICATION

The present disclosure claims the priority of Chinese patent application No. CN202111539017.0, entitled “CENTRALIZED LIGHT SUPPLY APPARATUS”, filed on Dec. 15, 2021, the entire contents of which are incorporated herein by reference.

TECHNICAL FIELD

Embodiments of the present disclosure relate to the field of communication, and in particular to a centralized light supply apparatus.

BACKGROUND

Currently, there are mainly two methods to realize a co-packaged optics (CPO) light source, including a built-in light source and a panel pluggable light source with an external laser source (ELS).

The built-in light source has the main advantages that the light source is built-in, an optical path is short, a coupling loss is small, and laser efficiency is relatively high. However, the defects are also very clear. Firstly, the technical difficulty is very high. Currently, there are few CPO light sources that can truly achieve commercial silicon-based integration. Secondly, because the built-in light source is close to a switch chip, the ambient temperature is relatively high, which leads to increased power consumption of a laser, decreased luminous efficiency, and an increased failure rate.

The ELS panel pluggable light source avoids the cases of the technical difficulties and the high ambient temperature of the built-in light source, but has a fatal defect of occupying a front panel of the device. Meanwhile, because each pluggable light source is independent, there are also serious problems in the aspect of ensuring the failure of light sources.

No solution has been proposed to solve the problem that the ELS panel pluggable light source in the related art occupies the front panel of the device.

SUMMARY

Embodiments of the present disclosure provide a centralized light supply apparatus, so as to at least solve the problems that in the related art, an ELS panel pluggable light source occupies a front panel of a device, and meanwhile, because each pluggable light source is independent, there are also serious problems in the aspect of ensuring the failure of light sources.

Embodiments of the present disclosure provide a centralized light supply apparatus. The centralized light supply apparatus includes: a controller, at least one light source pool, and a plurality of CPO switches. The controller is connected with the light source pool and the plurality of CPO switches through a two-way communication channel, and the light source pool is connected with the plurality of CPO switches through a photoelectric hybrid connector. The controller is configured to control the light source pool and the plurality of CPO switches. The light source pool is configured to output a light source to the plurality of CPO switches under control of the controller. The plurality of CPO switches are configured to modulate the received light source into an optical signal under control of the controller and output the optical signal.

In an exemplary embodiment, the light source pool includes: a plurality of light sources and one optical cross matrix, the optical cross matrix is respectively connected with the plurality of light sources and the plurality of CPO switches through optical fibers, and the plurality of light sources are connected with the controller respectively.

In an exemplary embodiment, the controller includes a control body and external interfaces, the external interfaces include a first interface connected with the plurality of CPO switches, and a second interface connected with the plurality of light sources and the optical cross matrix.

In an exemplary embodiment, the plurality of light sources include a plurality of normal light sources, hot backup light sources, and cold backup light sources, the optical cross matrix includes a plurality of controllable optical switches, each of the plurality of CPO switches includes a plurality of CPO modules, one controllable optical switch is connected with one normal light source, each of the plurality of controllable optical switches is connected with the hot backup light sources and the cold backup light sources, and one controllable optical switch is connected with one CPO module, and is used for arbitrary switching between input light sources and output light sources, and protecting the plurality of light sources.

In an exemplary embodiment, the controller is further configured to close the optical cross matrix after power-on, and control startup of a light source corresponding to a target CPO module after completing handshake and confirmation with the target CPO module in the plurality of CPO switches. The target CPO module is configured to send light source connection status information to the controller after handshake and confirmation with the controller.

In an exemplary embodiment, the target CPO module is further configured to write the light source connection status information into a status register; and the controller is configured to obtain the light source connection status information of the target CPO module by polling the status register, and control a controllable optical switch corresponding to the target CPO module to turn on the plurality of light sources after determining that the target CPO module indicates startup of the plurality of light sources.

In an exemplary embodiment, the CPO module is further configured to store information of a faulty light source to a status register when detecting that a received light source is instable or no light source is received. The controller obtains the information and notifies the light source pool of the information of the faulty light source by polling the status register. The light source pool is configured to switch the hot backup light source to the faulty light source after confirming the information of the faulty light source, meanwhile change the cold backup light source into the hot backup light source, and send an early warning signal to the controller. The controller is further configured to maintain light sources of the light source pool according to the early warning signal.

In an exemplary embodiment, the CPO module is configured to obtain fault information of a target light source, adjust traffic according to the fault information of the target light source, and write the fault information of the target light source into a status register. The fault information of the target light source is pre-determined by the controller according to historical usage data of the plurality of light sources and status data of the optical cross matrix, and then is written into the register. The controller is further configured to obtain the fault information of the target light source by polling the status register, and notify the controllable optical switch corresponding to the CPO module to perform light source switching.

In an exemplary embodiment, the CPO module is configured to detect disconnection from the photoelectric hybrid connector and write corresponding light source absence information into a status register; and the controller is further configured to obtain corresponding light source absence information of the CPO module by polling the status register, and control shutdown of a light source corresponding to the CPO module.

In an exemplary embodiment, the plurality of light sources in the light source pool and the optical cross matrix belong to an integrated module, and an internal controller is arranged in the light source pool.

In an exemplary embodiment, the photoelectric hybrid connector includes optical signal coupling points, electrical signal connection points, and positioning pins, and alternatively, the photoelectric hybrid connector includes optical signal coupling points, electrical signal connection points, and positioning holes. The optical signal coupling points are used for transmitting a light source to the plurality of CPO switches. The electrical signal connection points and the positioning pins are used for connecting the controller. Alternatively, the electrical signal connection points and the positioning holes are used for connecting the controller.

DETAILED DESCRIPTION OF THE EMBODIMENTS

Embodiments of the present disclosure are described in detail with reference to the accompanying drawings and in conjunction with embodiments as below.

It should be noted that the terms such as "first" and "second" of the specification and claims of the present disclosure and the foregoing accompanying drawings are used to distinguish similar objects but are not necessarily intended to describe specific sequences or precedence orders.

Figure 1:
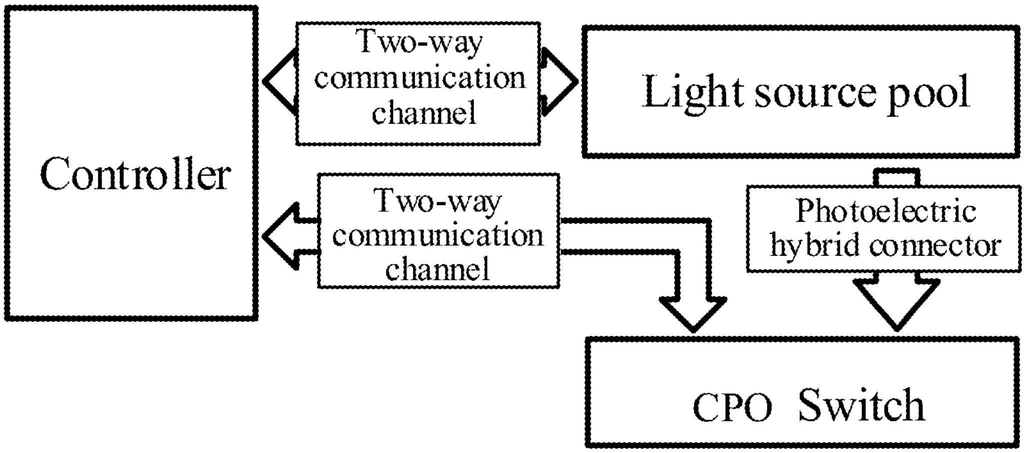
FIG. 1 is a block diagram of a centralized light supply apparatus according to an embodiment of the present disclosure.

An embodiment of the present disclosure provides a centralized light supply apparatus. FIG. 1 is a block diagram of a centralized light supply apparatus according to an embodiment of the present disclosure. As shown in FIG. 1, the centralized light supply apparatus includes a controller, at least one light source pool, and a plurality of CPO switches. The controller is connected with the light source pool and the plurality of CPO switches through a two-way communication channel, and the light source pool is connected with the plurality of CPO switches through a photoelectric hybrid connector. The controller controls the light source pool and the plurality of CPO switches. The controller is connected with the light source pool and the plurality of CPO switches through the two-way communication channel, thereby supporting actions of the above light source pool. The light source pool is controlled by the controller to output a light source to the plurality of CPO switches, and the plurality of CPO switches are controlled by the controller to modulate the received light source as an optical signal and output the optical signal. That is, after receiving the plurality of light sources, the plurality of CPO switches modulate the plurality of light sources as the optical signal, thereby achieving external data connection by the switches. A high-density connector may be used as the photoelectric hybrid connector in this embodiment of the present disclosure, such as a 256-fiber or 3456-fiber connector.

Specifically, the light source pool may achieve three functions: outputting the plurality of light sources to the switch; notifying a CPO module in the plurality of CPO switches of early warning light source information and then switching the plurality of light sources; and receiving fault information fed back from the CPO module to switch the faulty light source.

To achieve the above functions, it is necessary to use the photoelectric hybrid connector to achieve connection between the light source pool and the plurality of CPO switches, use an optical connector to achieve external connection of the light source pool, and use an electrical connector to achieve connection between the controller and the plurality of CPO switches as well as the light source pool.

This embodiment of the present disclosure may be applied to a data center (DC) switch and a distributed disaggregated chassis (DDC) type router device, and an application environment is typically a DC machine room or a machine room of an operator. In this environment, it is more convenient to adopt an integrated light supply method, similar to a centralized water cooling method, and in this case, centralized light supply may be seen as an infrastructure. A specific implementation solution for the plurality of CPO switches and the DDC type router is to directly butt joint a photoelectric hybrid connector of the plurality of light sources and a CPO photoelectric hybrid connector of the adopted device. The switch in this embodiment may specifically be a DC switch, a DDC type router, and a general-purpose switch.

Figure 2:
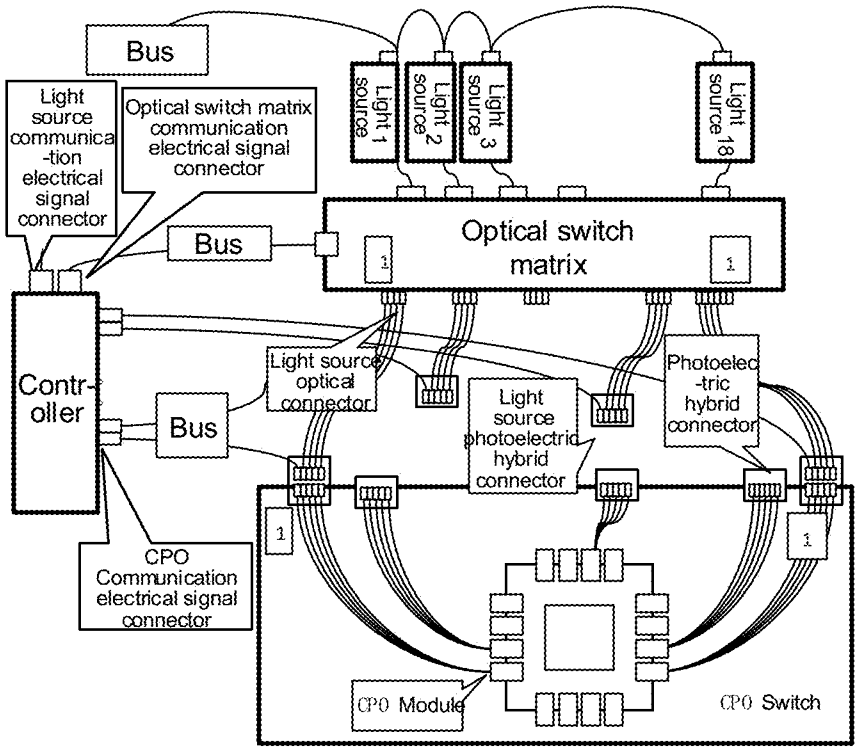
FIG. 2 is a first schematic diagram of a centralized light supply apparatus according to an embodiment of the present disclosure.

FIG. 2 is a first schematic diagram of a centralized light supply apparatus according to an embodiment of the present disclosure. As shown in FIG. 2, each light source pool includes a plurality of light sources and one optical cross matrix, where the optical cross matrix is respectively connected with the plurality of light sources and CPO switches through optical fibers, and the plurality of light sources are connected with a controller through an inter-integrated circuit ($I^2C$) bus.

Each of the plurality of light sources in the light source pool shown in FIG. 2 may include a light source group composed of a plurality of paths of light sources, or may be a single path light source. For the convenience of description, this embodiment takes 18 paths of light sources as an example. Each of the 18 paths of light sources includes 4 separate light sources, and in this embodiment, each path of light source is composed of 4 single light sources. The plurality of light sources adopt a 16+2 configuration, with 16 light sources normally operating, 1 hot backup light source, and 1 cold backup light source. All the plurality of light sources may be connected with an optical switch matrix in a pluggable manner.

In this embodiment, that a 16+2 light source backup may be adopted to perform centralized light supply for a 16-CPO switch may be used as an example. Specifically, the light source pool includes light sources and an optical switch matrix. In this embodiment of the present disclosure, the plurality of light sources may adopt the following specifications: a single wave with the wavelength of 1310 nm and 4 waves with the wavelengths centered at 1271-1291-1311-1331 nm, and are connected with the optical switch matrix through optical fibers. All the plurality of light sources may be connected with the controller through the $I^2C$ bus.

The optical switch matrix includes a 18*16*4 controllable optical switch, thereby achieving arbitrary switching between 18 input light sources and 16 output light sources so as to protect the plurality of light sources. The optical switch matrix outputs the plurality of light sources to the plurality of CPO switches through a light source optical connector.

The controller includes a control body and external interfaces. The external interfaces include an interface connected with the plurality of CPO switches, and an interface connected with the plurality of light sources and the optical switch matrix. Therefore, a control relationship between the light source pool and each of the plurality of CPO switches is achieved.

The CPO switch is connected with the optical switch matrix of the light source pool through the CPO photoelectric hybrid connector, and after the plurality of light sources enter CPO, modulation is performed to achieve data optical transmission.

Figure 3:
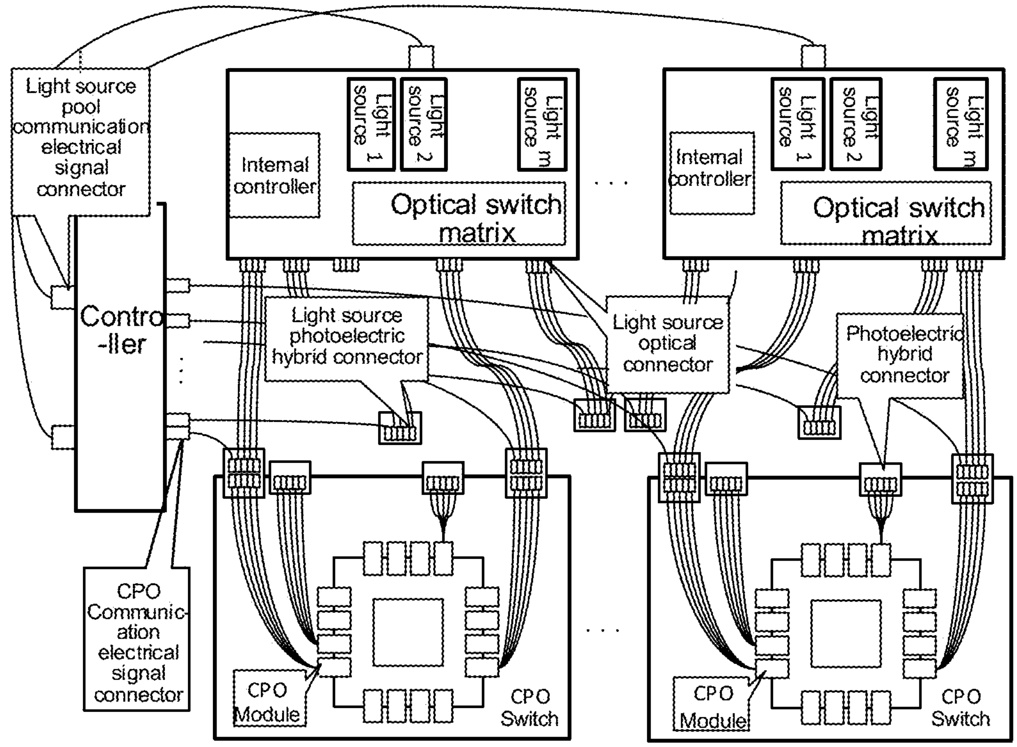
FIG. 3 is a second schematic diagram of a centralized light supply apparatus according to an embodiment of the present disclosure.

FIG. 3 is a second schematic diagram of a centralized light supply apparatus according to an embodiment of the present disclosure. As shown in FIG. 3, the plurality of light sources in the light source pool and the optical cross matrix belong to an integrated module, an internal controller is arranged in the light source pool, and therefore control of the entire light source pool can be simplified. The centralized light supply apparatus shown in FIG. 3 includes a controller, light sources, optical switch matrices, and CPO switches. The differences from the implementation solution shown in FIG. 2 are that the light source pool adopts a solution where the plurality of light sources and the optical switch matrix are combined into one; and the light source pool supports configuration across the plurality of CPO switches and also supports cascading of the plurality of light sources, that is, one light source pool can support a plurality of DC switches, and meanwhile a plurality of light source pools may be cascaded and expanded through a single controller. The light source pool adopts the solution of combining the plurality of light sources and the switch matrix into one, and one controller may be arranged in the light source pool, thereby facilitating simple control of the entire light source pool. Due to cascading of the plurality of light source pools, during implementation of m+n backup inclusion, it is necessary to consider implementing protection within the optical switch matrix.

In an exemplary embodiment, the controller includes a control body and external interfaces. The external interfaces include a first interface connected with the plurality of CPO switches, and a second interface connected with the plurality of light sources and the optical cross matrix.

In an exemplary embodiment, the plurality of light sources include a plurality of normal light sources, hot backup light sources, and cold backup light sources. The optical cross matrix includes a plurality of controllable optical switches. Each of the plurality of CPO switches includes a plurality of CPO modules. One controllable optical switch is connected with one normal light source, and each of the plurality of controllable optical switches is connected with the hot backup light sources and the cold backup light sources. One controllable optical switch is connected with one CPO module, and is used for arbitrary switching between input light sources and output light sources, and protecting the plurality of light sources.

In an exemplary embodiment, the controller is further configured to close the optical cross matrix after power-on, and control startup of a light source corresponding to a target CPO module after completing handshake and confirmation with the target CPO module in the plurality of CPO switches. The target CPO module is configured to send light source connection status information to the controller after handshake and confirmation with the controller. After power-on, the controller closes the optical switch matrix and turns on any one of paths of light sources. Once a specific CPO module completes the handshake and confirmation with the controller, the controller turns on the specific path of light source and connects the started light source to the CPO module through the optical switch matrix, thereby completing the start process of the light plurality of sources of the CPO module. Upon completion of the light source connection, the CPO module notifies the controller of light source connection status information of the CPO module. A communication process for this process is implemented through an $I^2C$ protocol in this embodiment, and may also be implemented through other protocols in a broad sense. The process completed through $I^2C$ is as follows: the CPO module writes status information into a register, the controller views, through polling, information of a status controller of the CPO module, and then writes information into the register indicating whether the plurality of light sources can be turned on. After receiving the information, the CPO module responds with a feedback that the plurality of light sources can be turned on. The controller turns on a specific power supply, and then opens an optical path in the optical matrix switch after performing polling to find confirmation information of the CPO module. The above process is repeated for the process of connecting other optical paths in the system until all the optical paths are opened, and then, the system enters a monitoring phase.

In an exemplary embodiment, the target CPO module further includes a status register, and is further configured to write the light source connection status information into the status register. The controller obtains the light source connection status information of the target CPO module by polling the status register, and after determining that the target CPO module indicates startup of the plurality of light sources, the controllable optical switch corresponding to the target CPO module is controlled to turn on the plurality of light sources. That is, when the CPO detects instability of an inputted modulated light source or no light input, the information is stored in the status register. The controller learns the information through inquiry and informs the light source pool of the information. After confirming the information, the light source pool immediately switches a light source in a hot backup status to a faulty light source, meanwhile, changes the cold backup light source into the hot backup light source, sends an early warning signal to the controller, and provides a prompt to maintain the plurality of light sources of the light source pool. Further, the CPO module is further configured to store information of a faulty light source to the status register when detecting that a received light source is instable or no light source is received. The controller obtains the information and notifies the light source pool of the information of the faulty light source by polling the status register. The light source pool is configured to switch the hot backup light source to the faulty light source after confirming the information of the faulty light source, meanwhile change the cold backup light source into the hot backup light source, and send an early warning signal to the controller. The controller is further configured to maintain the plurality of light sources of the light source pool according to the early warning signal.

In an exemplary embodiment, the CPO module is configured to obtain fault information of the target light source, adjust traffic according to the fault information of the target light source, and write the fault information of the target light source into the status register. The fault information of the target light source is pre-determined by the controller according to historical usage data of the plurality of light sources and status data of the optical cross matrix, and then is written into the register. The controller is further configured to obtain the fault information of the target light source by polling the status register, and notify the controllable optical switch corresponding to the CPO module to perform light source switching. The controller pre-judges a light source possibly having faults according to the historical usage data of the plurality of light sources and status data of the optical switch matrix. Once confirmed, the controller writes the information into an $I^2C$ register of the CPO module, and after knowing this case, the CPO module adjusts traffic, and writes the information into the register after preparation. After polling the information, the controller notifies the light source pool to achieve light source switching.

In an exemplary embodiment, the CPO module is configured to detect disconnection from the photoelectric hybrid connector and write corresponding light source absence information into the status register; and the controller is further configured to obtain the corresponding light source absence information of the CPO module by polling the status register, and control shutdown of a light source corresponding to the CPO module. Human eye safety of the plurality of light sources can be achieved. That is, after the light source photoelectric hybrid connector and the CPO photoelectric hybrid connector are connected, the controller and the CPO perform a handshake to confirm the connection, and then the plurality of light sources in the light source pool are turned on. After it is detected that the plurality of light sources are not connected to the CPO module, that is, the CPO module is not connected to the photoelectric hybrid connector, the CPO module finds that the corresponding light source is not in place, the controller closes the optical switch matrix corresponding to the plurality of light sources, and meanwhile turns off the plurality of light sources corresponding to the CPO module. Before inquiring confirmation information of the CPO module connected with the plurality of light sources, a switching power supply cannot be turned on.

Figure 4:
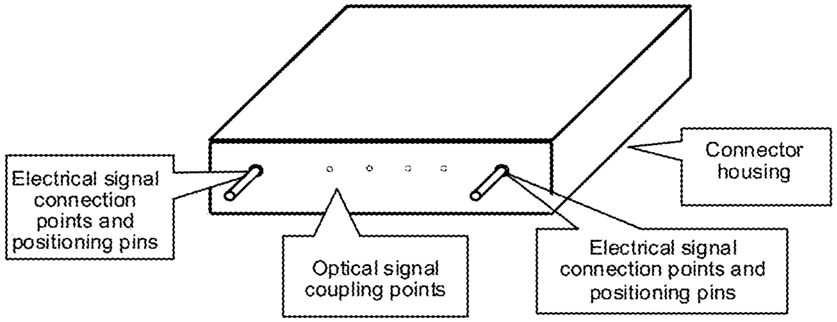
FIG. 4 is a first schematic diagram of a light source photoelectric hybrid connector according to an embodiment of the present disclosure.
Figure 5:
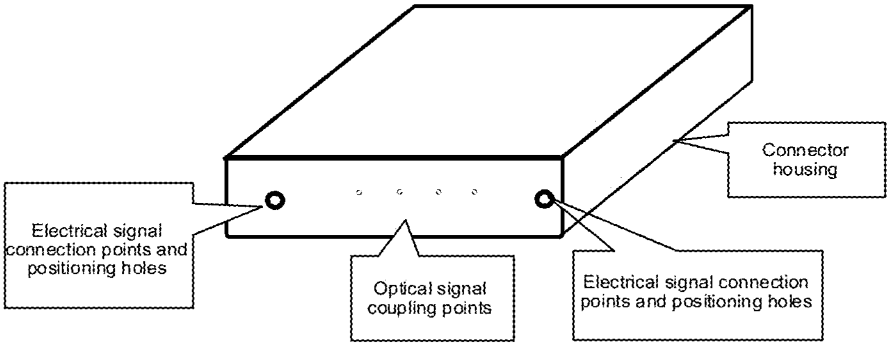
FIG. 5 is a second schematic diagram of a light source photoelectric hybrid connector according to an embodiment of the present disclosure.

FIG. 4 is a first schematic diagram of a light source photoelectric hybrid connector according to an embodiment of the present disclosure. As shown in FIG. 4, the photoelectric hybrid connector includes optical signal coupling points, electrical signal connection points, and positioning pins. FIG. 5 is a second schematic diagram of a light source photoelectric hybrid connector according to an embodiment of the present disclosure. As shown in FIG. 5, the photoelectric hybrid connector includes optical signal coupling points, electrical signal connection points, and positioning holes. The optical signal coupling points are used for transmitting a light source to the plurality of CPO switches. The electrical signal connection points and the positioning pins are used for connecting the controller. Alternatively, the electrical signal connection points and the positioning holes are used for connecting the controller.

The embodiments of the present disclosure mainly focus on centralized light supply and optimized design for the CPO. Firstly, failed light sources are switched. That is, once the CPO detects the absence or loss of an input light source, the CPO immediately notifies the controller to switch an existing light source, thereby achieving hot switching of the plurality of light sources, and greatly reducing the case of packet loss. Secondly, based on the health status of the plurality of light sources, the controller predicts that some light sources may have anomalies. After notifying the CPO, automatic switching is performed to the backup light source. Thirdly, an m+n backup solution is implemented for the light source pool. That is, m light sources are in a working status, and n light sources are in a backup status. Among these n backups, a certain number of hot backups and cod backups are configured. The embodiments of the present disclosure may achieve zero failure of the plurality of light sources.

A light source pool system of the present disclosure may achieve horizontal expansion. That is, through one controller, horizontal expansion of a plurality of light source pools is achieved, and unified management and control of the plurality of light source pools are achieved. The controller also can be expanded through expansion slots.

In the embodiments of the present disclosure, the photoelectric hybrid connector similar to the CPO is used to achieve the effects of the above information handshake and decrease in panel space occupation, allowing more optical fibers to be accessed in a 1RU space panel by using the photoelectric hybrid connector in the embodiments. An electrical channel realizes information exchange between the CPO and the light source pool, and the optical path realizes coupling transmission of optical signals.

Obviously, those skilled in the art should understand that the modules or steps in the present disclosure may be implemented through a general-purpose computing device, which may be centralized in a single computing device or distributed over a network formed by a plurality of computing devices, and may be implemented by executable program code of the computing device, such that the modules or steps may be stored in a storage apparatus to be executed by the computing device; and in some cases, the shown or described steps may be executed in a different order than presented here, or the modules or steps may be made into various integrated circuit modules, or more of the modules or steps may be made into a single integrated circuit module to be implemented. Therefore, the present disclosure is not limited to any specific hardware and software combination.

The above contents are merely preferred embodiments of the present disclosure, and are not intended to limit the present disclosure, and for those skilled in the art, the present disclosure may have various modifications and changes. Any modification, equivalent replacement, improvement, etc. made within the principle of the present disclosure shall fall within the scope of protection of the present disclosure.

The invention claimed is:

1. A centralized light supply apparatus, comprising: a controller, at least one light source pool, and a plurality of co-packaged optics (CPO) switches, wherein the controller is connected with the light source pool and the plurality of CPO switches through a two-way communication channel, and the light source pool is connected with the plurality of CPO switches through a photoelectric hybrid connector;

the controller is configured to control the light source pool and the plurality of CPO switches;

the light source pool is configured to output a light source to the plurality of CPO switches under control of the controller; and the plurality of CPO switches are configured to modulate the received light source into an optical signal under control of the controller and output the optical signal;

wherein the light source pool comprises: a plurality of light sources and one optical cross matrix, the optical cross matrix is respectively connected with the plurality of light sources and the plurality of CPO switches through optical fibers, and the plurality of light sources are connected with the controller respectively.

2. The centralized light supply apparatus according to claim 1, wherein the plurality of light sources in the light source pool and the optical cross matrix belong to an integrated module, and an internal controller is arranged in the light source pool.

3. The centralized light supply apparatus according to claim 1, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

4. The centralized light supply apparatus according to claim 1, wherein the controller comprises a control body and external interfaces, the external interfaces comprise a first interface connected with the plurality of CPO switches, and a second interface connected with the plurality of light sources and the optical cross matrix.

5. The centralized light supply apparatus according to claim 4, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

6. The centralized light supply apparatus according to claim 4, wherein the plurality of light sources in the light source pool and the optical cross matrix belong to an integrated module, and an internal controller is arranged in the light source pool.

7. The centralized light supply apparatus according to claim 1, wherein the plurality of light sources comprise a plurality of normal light sources, hot backup light sources, and cold backup light sources, the optical cross matrix comprises a plurality of controllable optical switches, each of the plurality of CPO switches comprises a plurality of CPO modules, one controllable optical switch is connected with one normal light source, each of the plurality of controllable optical switches is connected with the hot backup light sources and the cold backup light sources, and one controllable optical switch is connected with one CPO module, and is used for arbitrary switching between input light sources and output light sources, and protecting the plurality of light sources.

8. The centralized light supply apparatus according to claim 7, wherein the controller is further configured to close the optical cross matrix after power-on, and control startup of a light source corresponding to a target CPO module after completing handshake and confirmation with the target CPO module in the plurality of CPO switches; and the target CPO module is configured to send light source connection status information to the controller after handshake and confirmation with the controller.

9. The centralized light supply apparatus according to claim 8, wherein the target CPO module is further configured to write the light source connection status information into a status register; and the controller is configured to obtain the light source connection status information of the target CPO module by polling the status register, and control a controllable optical switch corresponding to the target CPO module to turn on the plurality of light sources after determining that the target CPO module indicates startup of the plurality of light sources.

10. The centralized light supply apparatus according to claim 9, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

11. The centralized light supply apparatus according to claim 8, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

12. The centralized light supply apparatus according to claim 7, wherein the CPO module is further configured to store information of a faulty light source to a status register when detecting that a received light source is instable or no light source is received;

the controller obtains the information and notifies the light source pool of the information of the faulty light source by polling the status register;

the light source pool is configured to switch the hot backup light source to the faulty light source after confirming the information of the faulty light source, meanwhile change the cold backup light source into the hot backup light source, and send an early warning signal to the controller; and the controller is further configured to maintain light sources of the light source pool according to the early warning signal.

13. The centralized light supply apparatus according to claim 12, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

14. The centralized light supply apparatus according to claim 7, wherein the CPO module is configured to obtain fault information of a target light source, adjust traffic according to the fault information of the target light source, and write the fault information of the target light source into a status register, wherein the fault information of the target light source is pre-determined by the controller according to historical usage data of the plurality of light sources and status data of the optical cross matrix, and then is written into the register; and the controller is further configured to obtain the fault information of the target light source by polling the status register, and notify a controllable optical switch corresponding to the CPO module to perform light source switching.

15. The centralized light supply apparatus according to claim 14, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

16. The centralized light supply apparatus according to claim 7, wherein the CPO module is configured to detect disconnection from the photoelectric hybrid connector and write corresponding light source absence information into a status register; and the controller is further configured to obtain the corresponding light source absence information of the CPO module by polling the status register, and control shutdown of a light source corresponding to the CPO module.

17. The centralized light supply apparatus according to claim 16, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

18. The centralized light supply apparatus according to claim 7, wherein the photoelectric hybrid connector comprises optical signal coupling points, electrical signal connection points, and positioning pins, and alternatively, the photoelectric hybrid connector comprises optical signal coupling points, electrical signal connection points, and positioning holes, wherein the optical signal coupling points are used for transmitting a light source to the plurality of CPO switches;

the electrical signal connection points and the positioning pins are used for connecting the controller; and alternatively, the electrical signal connection points and the positioning holes are used for connecting the controller.

* * * * *